US012751423B2

(12) United States Patent
Schultz

(10) Patent No.: US 12,751,423 B2
(45) Date of Patent: Oct. 6, 2026

(54) PET GROOMING DEVICE WITH SCISSORING ACTION BETWEEN A LINKAGE ARM AND TINES

(71) Applicant: Brian Schultz, Oceanside, CA (US)

(72) Inventor: Brian Schultz, Oceanside, CA (US)

( * ) Notice: Subject to any disclaimer, the term of this patent is extended or adjusted under 35 U.S.C. 154(b) by 0 days.

(21) Appl. No.: 19/070,498

(22) Filed: Mar. 4, 2025

(65) Prior Publication Data

US 2025/0194564 A1 Jun. 19, 2025

Related U.S. Application Data

(63) Continuation of application No. 17/885,779, filed on Aug. 11, 2022, now Pat. No. 12,239,101.

(60) Provisional application No. 63/233,145, filed on Aug. 13, 2021.

(51) Int. Cl.
*A01K 13/00* (2006.01)

(52) U.S. Cl.
CPC .................................. *A01K 13/002* (2013.01)

(58) Field of Classification Search
CPC .................. A01K 13/002; A01K 13/00; A46B 2200/1093; A46B 13/005; A46B 15/0065; A46B 13/02; A46B 7/06; A46B 13/08; A46B 1/04; A46B 1/12; A46B 1/14; A01D 7/10; A01D 9/06; B26B 19/06; B26B 19/38; B26B 19/14; B26B 19/3846; B26B 19/145; B26B 19/063; A01G 3/053; A45D 24/00
USPC .......................................................... 119/627
See application file for complete search history.

(56) References Cited

U.S. PATENT DOCUMENTS

| | | | | | | |
|---|---|---|---|---|---|---|
| 2,512,127 | A | * | 6/1950 | Adams | A01K 13/002 | 119/632 |
| 2,529,012 | A | * | 11/1950 | Gleekman | A01K 13/002 | 15/236.08 |
| 2,622,387 | A | * | 12/1952 | Brooke | A01D 7/08 | 56/400.17 |
| 2,961,996 | A | * | 11/1960 | Oliver | A01K 13/002 | 119/600 |
| 3,253,292 | A | * | 5/1966 | Herschensohn | A46B 5/0025 | 132/156 |
| 3,491,725 | A | * | 1/1970 | Maniscalco | A01K 13/002 | 56/400.21 |
| 3,530,524 | A | * | 9/1970 | Clemans | B44D 3/162 | 15/236.08 |
| 3,794,050 | A | * | 2/1974 | Gallanis | A45D 24/007 | 132/119.1 |
| 3,870,056 | A | * | 3/1975 | Stemme | A45D 24/007 | 132/119.1 |
| 5,915,391 | A | * | 6/1999 | Revil | A45D 24/007 | 132/119.1 |
| 5,967,150 | A | * | 10/1999 | Wright | A45D 24/007 | 132/119.1 |

(Continued)

*Primary Examiner* — Zoe Tam Tran
(74) *Attorney, Agent, or Firm* — Frederic M. Douglas

(57) ABSTRACT

The present invention may comprise a grooming and dematting tool with a housing, a plurality of tines extending outward from the housing, each tine linked with a linkage arm, each linkage arm independently activated by a crankshaft to urge the distal ends of each tine back and forth, up, and down, or in other translational or extending movement pattern. The tines urge hair or fur of a pet to untangle or remove knots, snags, matting, and imperfections in the coat, while optionally cooperating with scissoring cutting blades to cut hair from the coat of the pet.

13 Claims, 6 Drawing Sheets

(56) References Cited

U.S. PATENT DOCUMENTS

| | | | | |
|---|---|---|---|---|
| 6,668,758 | B1 * | 12/2003 | Davis, Jr. | A01K 13/002 132/129 |
| 6,955,137 | B2 * | 10/2005 | Dunn | A01K 13/002 119/617 |
| D614,818 | S * | 4/2010 | Moore | D30/158 |
| D844,261 | S * | 3/2019 | Agtual | A46B 9/028 D30/158 |
| 2012/0022556 | A1 * | 1/2012 | Sanchez-Martinez | B26B 19/3873 606/133 |
| 2014/0026821 | A1 * | 1/2014 | Tu | A01K 13/002 119/600 |
| 2014/0238310 | A1 * | 8/2014 | Holt, Jr. | A01K 13/002 119/631 |
| 2015/0201582 | A1 * | 7/2015 | Longoria | B26B 19/24 119/609 |
| 2018/0279756 | A1 * | 10/2018 | Axelrod | A01K 13/002 |

* cited by examiner

PET GROOMING DEVICE WITH SCISSORING ACTION BETWEEN A LINKAGE ARM AND TINES

CROSS-REFERENCE TO RELATED APPLICATIONS

The application is a continuation of and claims the benefit of priority from U.S. patent application Ser. No. 17/885,779, filed Aug. 11, 2022 (now U.S. Pat. No. 12,239,101), which claims priority from U.S. Provisional Patent Application No. 63/233,145, filed on Aug. 13, 2021, the contents of which are incorporated herein by reference, in their entirety.

BACKGROUND OF THE INVENTION

The disclosure relates generally to a pet hair grooming device and method. More specifically, the disclosure relates to a method and apparatus for untangling, dematting, and/or cutting pet hair with the option of combing through the hair or fur of an animal, when a knot is encountered, the apparatus may be rotated to engage the scissors nip which cuts through the mat or knot of hair of an animal.

Many animals, such as dogs, have a coat of fur that includes an undercoat and a topcoat. The topcoat may include rough, rather weather-resistant fur that repels water, wind, dirt, and debris. The undercoat usually comprises thick, warm, down-like fur comprising generally shorter hairs than those of the topcoat. The undercoat fur is usually dense enough for resisting penetration of water to the skin of the animal and provides an insulating layer to help in keeping the animal warm. Many animals, and particularly dogs and cats, seasonally grow a dense undercoat, which in turn, also seasonally sheds.

Such shedding occurs because follicles of hair in an animal's coat follow a cycle of growing, dying, and replacement by another follicle. When a follicle dies, the hair becomes detached, or sheds. This shedding process may occur constantly. The rate at which fur sheds may be affected by factors such as the breed, age, and environment of the dog or cat.

While undercoat shedding occurs naturally, it may be advantageous to assist in the removal of the undercoat by grooming the animal. For example, if a dog is kept indoors, the owner may wish to facilitate or accelerate the shedding process by brushing or combing the fur of the dog to remove loose fur or fur that will soon be shed, a process referred to as de-shedding.

De-shedding an animal has several advantages versus allowing natural shedding. For many people, loose animal fur may be an allergen such that limiting the amount of fur shed indoors can prevent unwanted allergy symptoms. Further, shed animal hair may cling to upholstery or clothing and may require much time and effort to remove the fur from such surfaces.

Facilitating the natural process of shedding through de-shedding may benefit the health and comfort of the animal. An excessive amount of residual undercoat may cause the animal to endure heat stress in warm climates due to the insulating properties of the undercoat. Also, undercoat removal of hair may prevent the animal's fur from becoming tangled or matted. Such grooming may also calm or relax the animal. Shed fur that has detached from the animal tends to collect and entangle with live hair, creating mats, which are knot-like clumps of hair. Pulling the knot with a comb tends to pull on the live hair follicles, which causes discomfort and pain to the animal.

Past grooming tools have not been very effective in easily removing tangled hair, matted fur, or debris from an animal's hair and fur. One limitation has been that grooming tools that may untangle or demat fur tend to cause pain to animals and discomfort. Previous dematting tools require excessive pulling and tugging, which increases an animal's discomfort and pain.

Although the present invention will be described with particular reference to a handpiece for grooming animals, in which the handpiece has a plurality of blades, tines, linkage arms, or variations thereof, it is to be noted that the scope of the present invention is not limited to the described arrangement or embodiment of the vibrating and reciprocating mechanism, but rather the scope is more extensive so as to include other arrangements of the moving tines and linkage arms and uses of a cranking mechanism, in applications other than the scissoring tines and to other forms and uses of the reciprocating mechanism.

In the past, there have been hand-held groomers using reciprocating or oscillating movements, that is, hand-held groomers having a fixed comb and a moveable cutter held in intimate contact with each other by a strong compressive force between the two, such as a rotating shaft. Such hand-held groomers are generally heavy and awkward, requiring a large amount of energy or power to drive the mechanisms and also requiring great effort and energy from the operator during use of the grooming tool. Because of the vibration generated by the reciprocating movement of such conventional hand-held groomers, extensive use is fatiguing for the persons using the groomer and risks permanent injury to the user, such as, repetitive strain injuries to the arms or the like.

Other disadvantages of conventional hand-held groomers include the problems of the rotating shaft and blades producing vibrations within the handpiece as it oscillates, with the rotating shaft, blades, and combs needing to be replaced regularly and sharpened.

Thus, it would be advantageous to have a device and a method that has vibration and cutting characteristics that are less likely to cause injury, safer to use, can operate at a lower temperature, demat pet fur with easy wrist movements, untangle and dematting fur while minimizing discomfort and pain, and can be readily used by anyone. It also would be advantageous to produce a dematting comb with integrated scissor blades to optionally cut through mats without causing pain.

As will be seen more fully below, the present invention is substantially different in structure, function, and approach from that of the hand-held pet grooming devices previously disclosed.

SUMMARY OF THE INVENTION

In one aspect of the present invention, a grooming tool comprises a housing including a handle portion and a combing portion; the combing portion including a plurality of tines; an array of linkage arms coupled to each of the tines, and a crank mechanism to individually activate the tines with translational movement and extending movement.

In another aspect of the present invention, a grooming tool comprises a housing including a handle portion and a comb portion, the comb portion having a plurality of tines and a plurality of linkage arms, an arcuate shaft mounted within the housing, the plurality of tines and the plurality of linkage arms mounted onto the arcuate shaft, a set of protective guard members connected to the housing and partially covering the arcuate shaft, and a structure connected to the plurality of linkage arms and mounted within the housing for urging the linkage arms in a reciprocating manner to activate the plurality of tines in a scissoring manner.

In yet another aspect of the present invention, a method of grooming an animal may comprise the steps of: (a) combing an animal by using a grooming device with a plurality of dematting tines; (b) repositioning the grooming device so as to present a plurality of cutting blades, each of said cutting blades having a sharp edge for aiding in removing mats from the fur of an animal; and (c) employing said dematting tines to remove at least one mat from the fur of an animal.

These and other aspects, objects, features, and advantages of the present invention are specifically set forth in, or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense but is made merely for the purpose of illustrating the general principles of the invention, since the scope of the invention is best defined by the appended claims.

Although the invention is often referred to herein as an apparatus and method for a hand-held grooming device, it is understood that such description is not limiting, such that the technology in this invention may be applied in numerous other products and methods, including but not limited to, combing, cutting, trimming, dematting, and other functions and uses.

According to the present invention, there is provided a hand-held grooming device suitable for cutting a material comprising, a cutting member (such as a blade or tine) capable of rotating motion in a first direction, and at least one cutting element (such as a blade or arm) capable of substantially linear movement in a second direction, the motion in the first direction being different from movement in the second direction, and wherein the cutting member is arranged in relation to the cutting elements such that the cutting member and cutting elements cooperatively interact with each other when operating to cut material located at a nip between the cutting member and the cutting element.

The grooming device disclosed herein uses curved blades for grooming, such as dematting to remove matted hair or fur. One set of grooming member blades or tines for dematting coarse animal hair or fur while a set of cutting elements can cut the hair or fur. This grooming device allows grooming without causing pain and discomfort to an animal and makes the grooming and dematting process more humanely practiced.

Figure 3A:
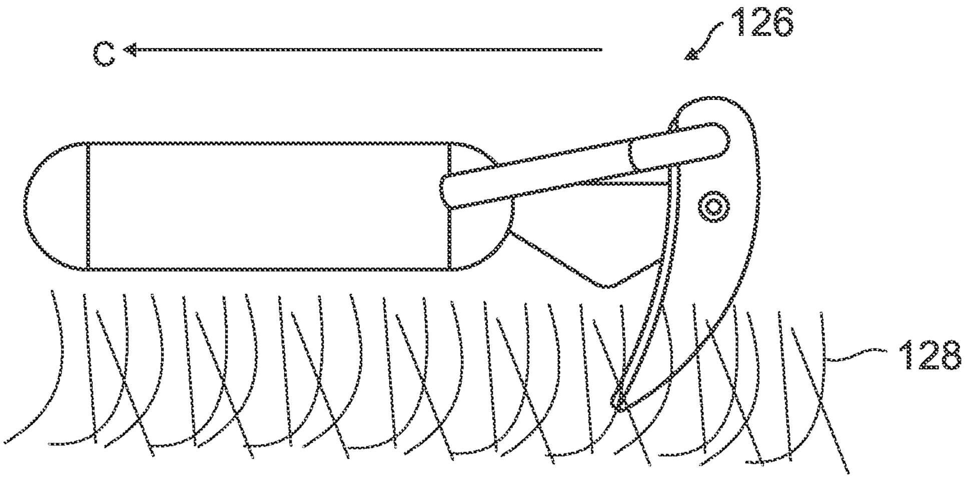
FIG. 3A is a plan view of operation of a grooming tool mechanism, according to yet another aspect of the invention.
Figure 3B:
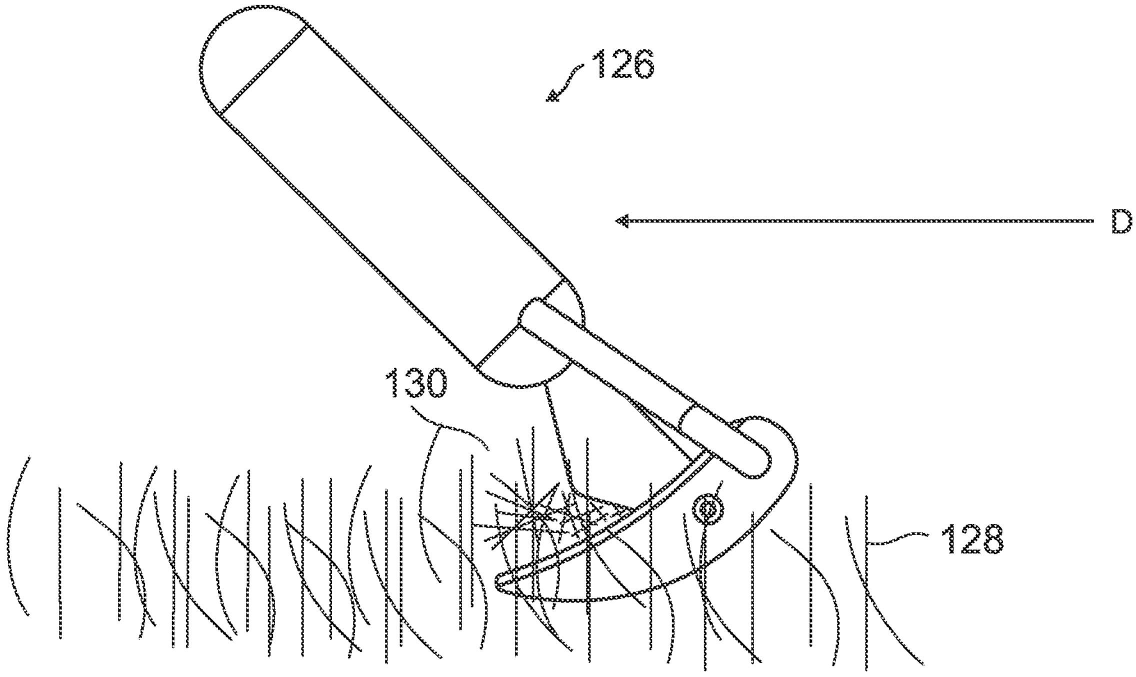
FIG. 3B is a plan view of operation of a grooming tool mechanism, according to still yet another aspect of the invention.

The present disclosure contemplates various embodiments of an electric hair grooming device illustrated in the accompanying drawings for untangling, dematting, and grooming pet hair and fur. As explained in more detail below, the disclosed embodiments of the hair grooming device are configured to have at least one operation which facilitates grooming of hair and comprises a battery, a motor, and a drive mechanism. In one disclosed embodiment, a battery may power the motor which in turn may drive a hair grooming device such as a comb assembly by the drive mechanism. The hair grooming device may further comprise a grooming device housing and a handle connected to the grooming device housing. At least a portion of the blade assembly, the motor, and the drive mechanism may be housed within the grooming device housing and/or handle. The battery may be housed either within the housing or the handle. Suitably, the hair grooming device may be sized to fit within a pocket or purse of the user. Moreover, the hair grooming device may be switched between a generally combing function, and with the wrist movement, be switched to additionally engage cutting elements for cutting fur that has matted, balled up, or otherwise become an unmanageable tangle of hair, as shown in FIGS. 3A, 3B below.

Often, the hand-held grooming device may comprise a handle portion, a hub, a body portion, and a guide means. The guide means may comprise a plurality of narrow, elongate fingers which form a comb or similar structure for guiding the hand-held grooming device along a predetermined pathway through the material to be cut or groomed, such as the fur covering of an animal, being wool, fur, hair, or the like.

The guide means may be integral with the body portion of the hand-held grooming device.

The cutting members and cutting elements may be placed on a shaft through holes in the cutting elements and cutting members, arranged in a fan-like formation, with an arcuate shaft or a straight shaft.

The cutting members, such as blades, may each have a leading edge and a trailing edge shaped so that the blades are swept back in relation to the normal forward direction of rotation of the blade in use. Even more usefully, the blades may be radially arcuately curved. Yet even more beneficially, both the leading edges and the trailing edges of the blades are curved in the same direction.

Often, the cutting element may be resiliently mounted or connected to the housing of the hand-held grooming device by a mounting means or connection means in such a manner so as to permit linear movement of the cutting element in relation to the body of the hand-held grooming device and the mounting means or connection means. Typically, the movement of the cutting element is in the direction of a main central plane of the handle of the hand-held grooming device.

Figure 1:
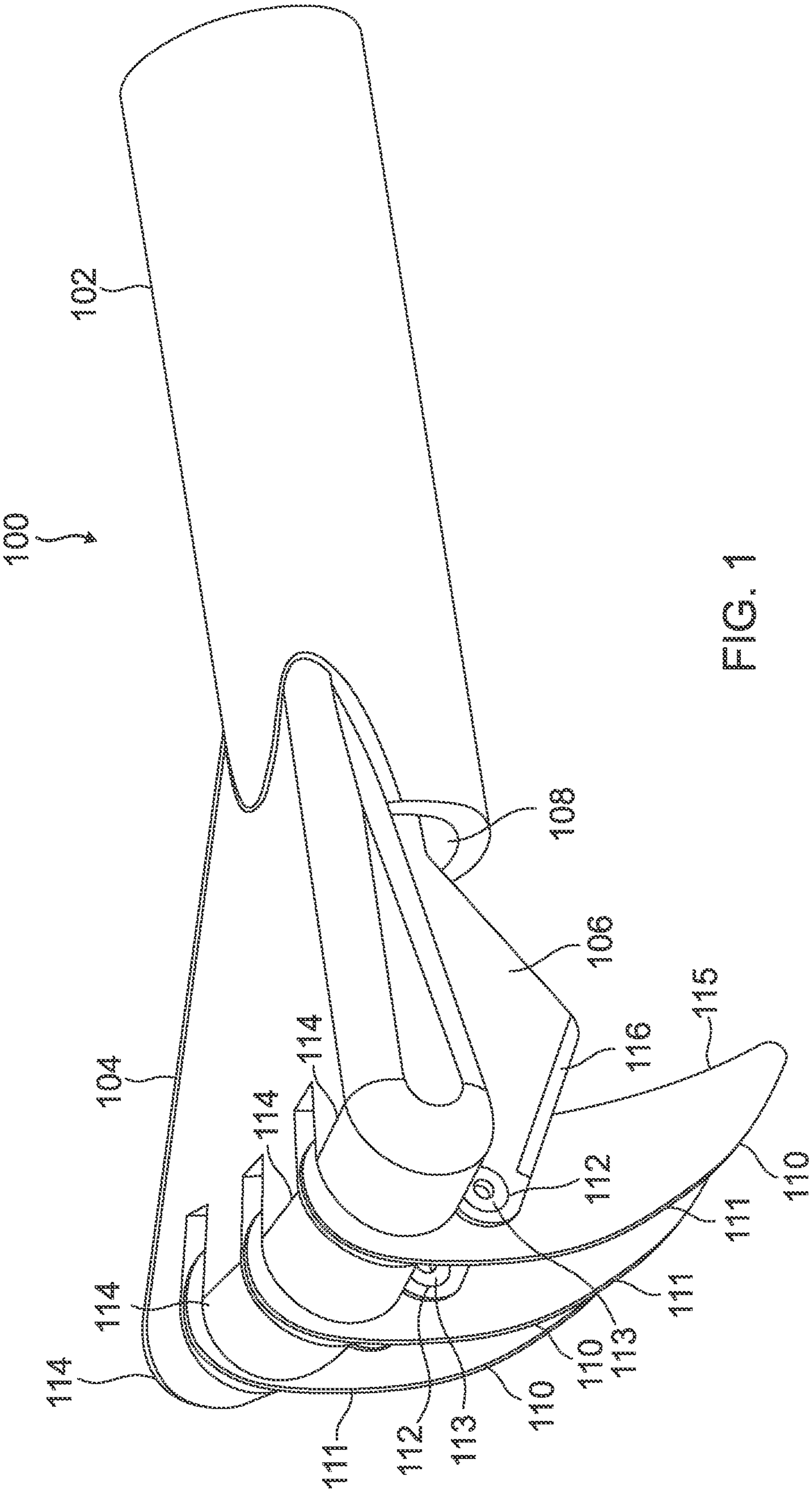
FIG. 1 is a perspective view of one embodiment of a grooming tool, according to one aspect of the invention.

Referring to FIG. 1, there is shown a grooming device 100 with a handle 102, a housing 104, with cutting elements 106 on linkage arms 108. The cutting members, blades, or dematting tines 110 may be in a scissoring relationship with the cutting elements 106. The through-holes 112 may be fitted with rivets 113 for securing each linkage arm 108 with each respective dematting tines 110. Each dematting tine 110 may have a leading edge 111 and a trailing edge 115. Projecting guide members 114 may serve to protect and guide the movements of dematting tines 110 and cutting elements 106, in a fan-shaped orientation to accommodate a shaft, such as a shaft in an arc shape, namely, an arcuate shaft, for relative rotation of the dematting tines 110 and the back-and-forth movement of the linkage arms 108 to move the cutting elements 106 towards and away from the cutting blades 110. Each cutting element may have a leading cutting edge 116.

The housing 104 may comprise a generally curved or crescent-shaped body portion comprising a plurality of projections, such as protecting guide members 114, extending substantially radially outwards from the curved body portion. Typically, the protecting guide members 114 are regularly spaced apart. Often, the protecting guide members 114, while being generally radially directed, are arranged to extend individually radially from the body of the housing 104. Optionally, the angle of extension of the individual radially extending protecting guide members 114 gradually change depending on the location of the protecting guide members 114 on the housing 104. The device 100 may have recesses in which the dematting tines 110 are releasably located, positioned adjacent to each protecting guide member 114.

The body portion of the housing 104 and the handle 102 may comprise a plastic or polymer-based composition such as a nylon-based polymer or the commercially available polyethylene terephthalate-based polymer or comprise other suitable materials.

Figures 2A, 2B:
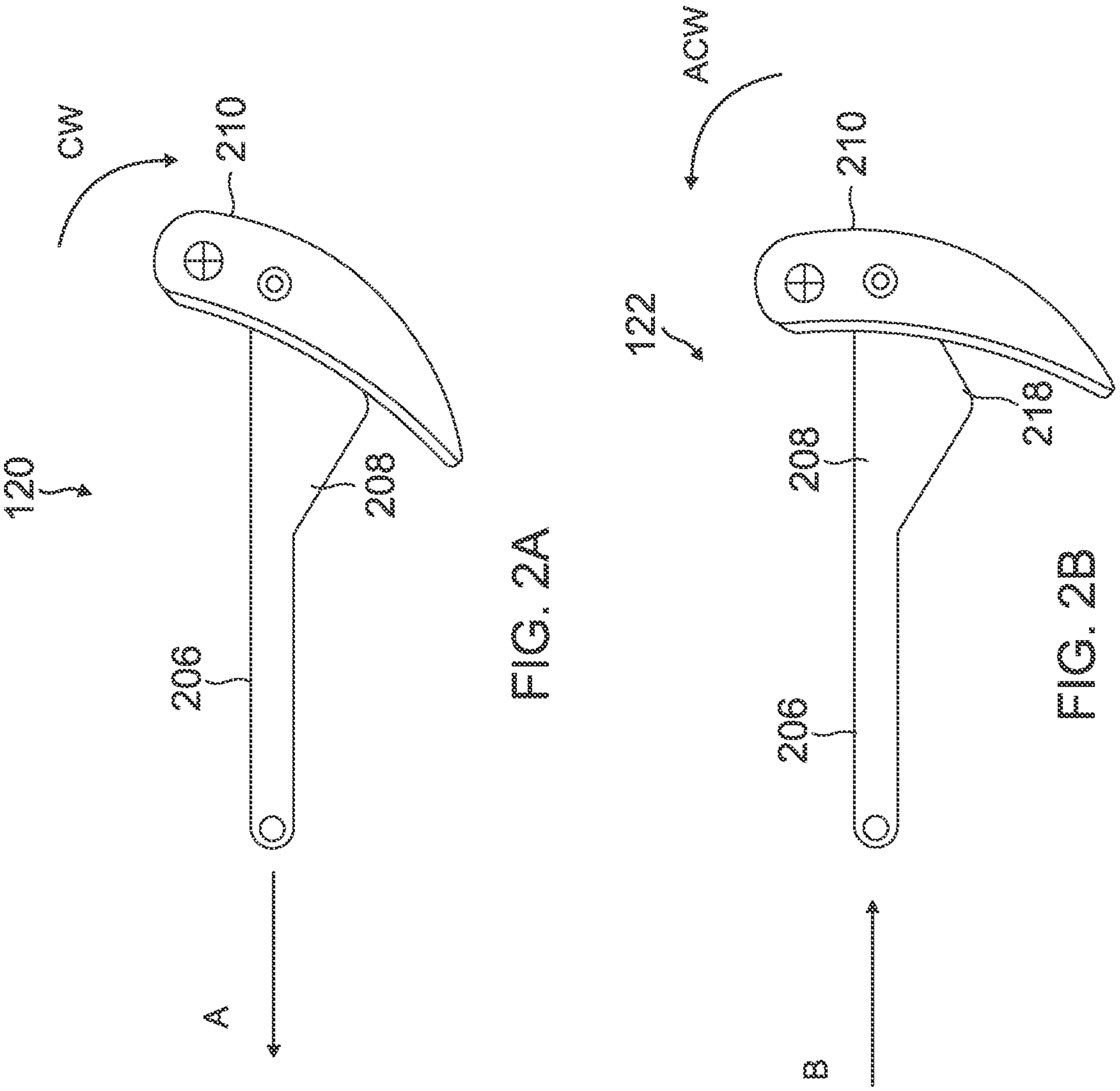
FIG. 2A is a plan view of operation of a grooming tool mechanism, according to one aspect of the invention.
FIG. 2B is a plan view of operation of a grooming tool mechanism, according to another aspect of the invention.

Turning to FIG. 2A, a cutting mechanism 120 is shown, which is urged horizontally in direction A by pulling on linkage arm 206, which causes the blade 210 to rotate clockwise (CW), leading to the closing of the nip between blade 210 and cutting element 208. In FIG. 2B, the cutting mechanism 122 is shown, when in compression by pressing on linkage arm 206 in direction B, with the blade 210 rotating anti-clockwise (ACW), also known as counter-clockwise, such that the nip between blade 210 and cutting element 208 remains open, exposing cutting edge 218. As can be understood from FIGS. 2A and 2B, the cutting mechanisms 120, 122 can vary in opening and closing, to cut items in the path of operation.

In FIGS. 3A and 3B, the operation of the cutting mechanism to groom hair or fur is shown. In FIG. 3A, grooming tool 124 travels in direction C through a coat of fur 128, essentially combing the hair during a grooming action. When a tangle, matting, debris, or other portion of hair not easily combed is encountered, the situation in FIG. 3B shows the grooming tool 126 when a user may elevate the handle of the tool 126 away from the coat of fur 128, while moving the tool 126 in direction D, which changes the linkages in the tool 126 and the interacting forces such that the tool's cutting feature is enacted to cut through the matting, knot, tangle, debris, or other obstacle 130.

The cutting elements and blades may be made from any suitable material or combination of materials. For example, the cutting elements and blades may comprise metal (such as steel) or synthetic material such as plastics, carbides, or polymers, or may comprise a mixture of components such as polymer-coated metal. The cutting elements or blades may, for example, be manufactured by cutting metal rod, bent sheet metal, metal pipe, or the like.

Figure 4:
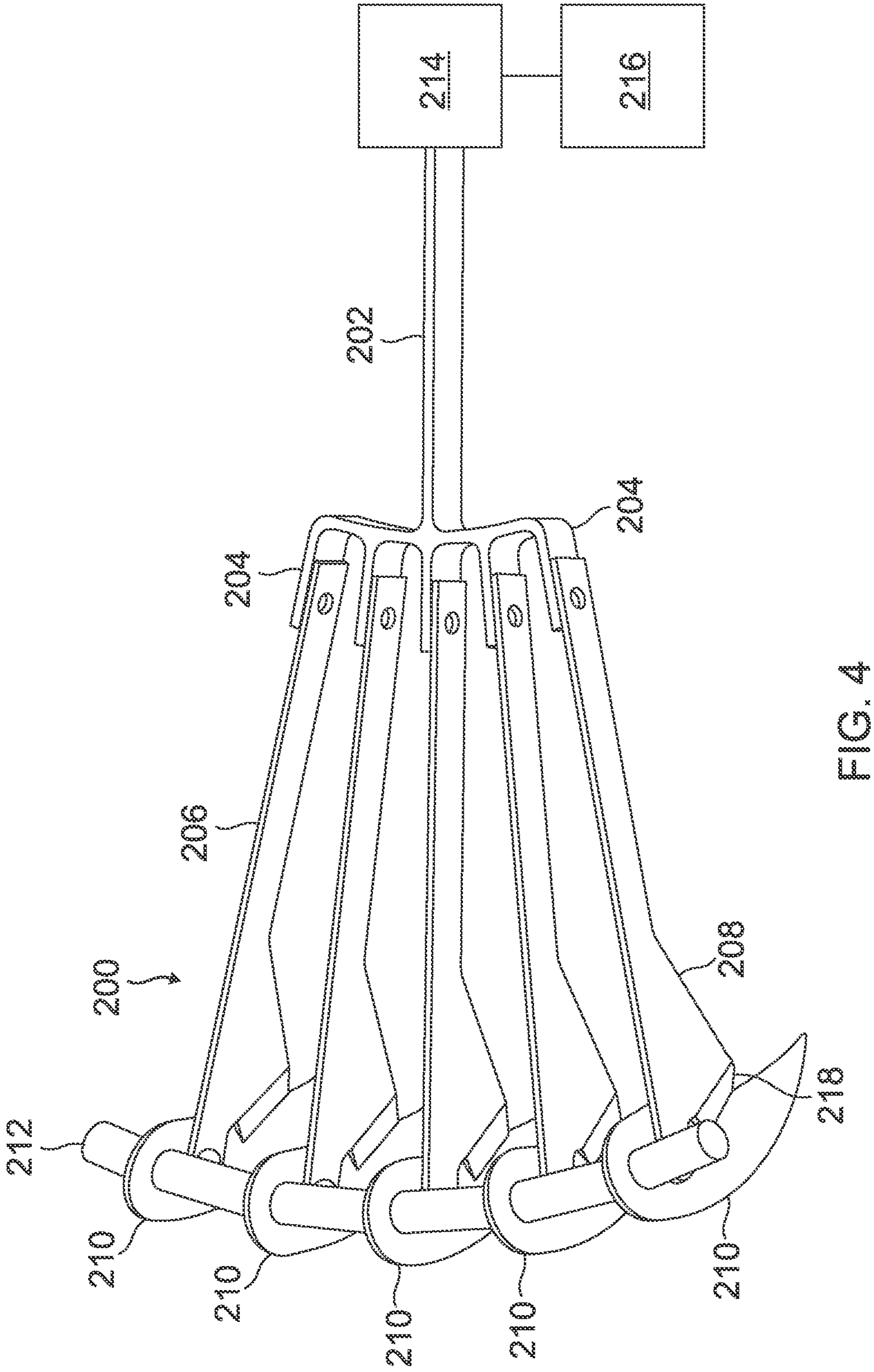
FIG. 4 is a perspective plan view of a grooming tool mechanism, according to one aspect of the invention.

With continuing reference to the figures and particular reference to FIG. 4, one exemplary grooming tool mechanism 200 is shown and described in more detail. The grooming tool mechanism 200 may be manufactured of any material that provides sufficient rigidity, strength, elasticity, and flexibility, such as steel. Follower arm 202 may be connected to a motor 214 and integral with follower arm brackets 204, which may be securely attached to linkage arms 206 for movement of cutting elements 208 to cause rotation of blades 210, held in rotation around stationary arcuate shaft 212. Motor 214 may be a piezoelectric motor to cause movement to translate follower arm 202 when power is supplied by power supply 216. Motor 214 also may cause high-frequency vibration to follower arm 202 for causing follower arm brackets 204, linkage arms 206, blades 210, and cutting element leading edges 218 to oscillate or vibrate, in unison, individually, or in various combinations.

Figure 5:
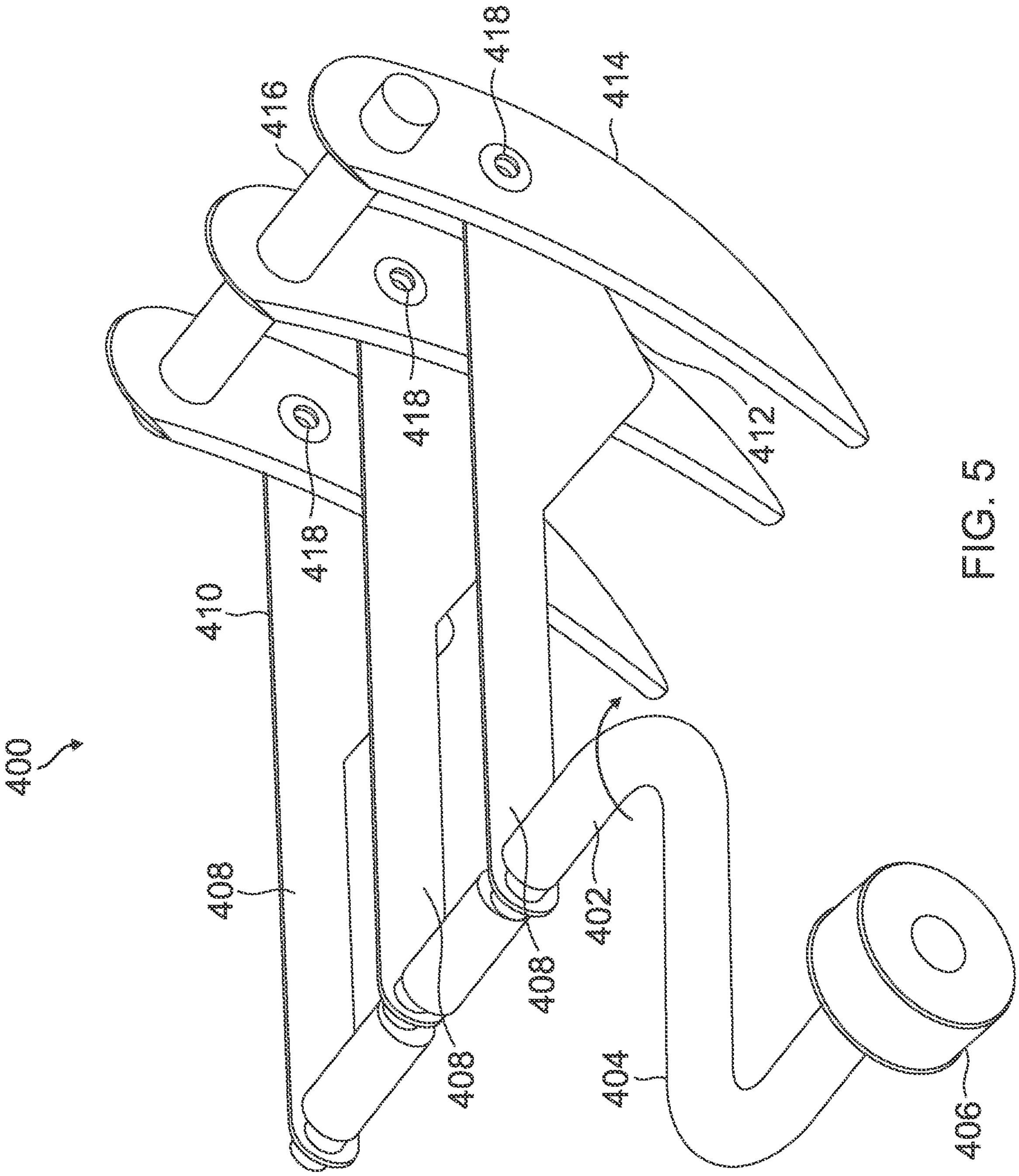
FIG. 5 is a perspective plan view of a grooming tool mechanism, with a hand crank component, according to another aspect of the invention.
Figure 6:
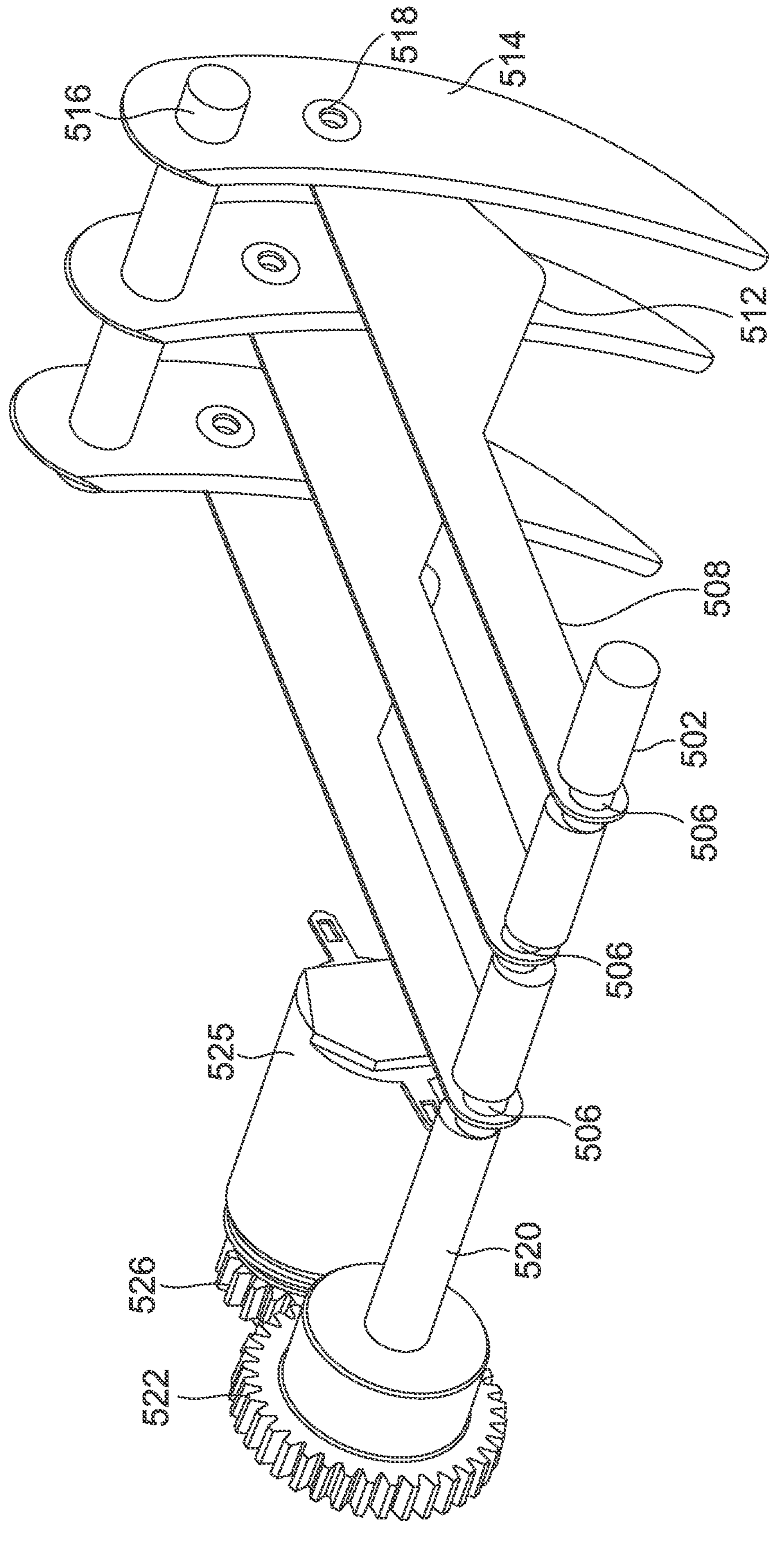
FIG. 6 is a perspective plan view of a grooming tool mechanism, with a motorized camshaft component, according to yet another aspect of the invention.

Another embodiment is shown in FIG. 5, wherein a grooming tool mechanism 400 comprises a rotating shaft 402 that is inserted into cutting elements 408 and rotated with crossbar 404 at an orthogonal position from rotating shaft 402, hand-cranked at crank handle 406. The movement of the rotating shaft 402 may move the cutting elements in unison, out of phase, or a combination thereof. The rotation of the rotating shaft 402 may cause the back and forth translation of the cutting elements 408 to pull on the cutting element bodies 410 to move the dematting tines 414 back and forth, secured by brads 418 to the cutting element bodies 410, and rotating back and forth while secured to a fixed shaft 416 to comb, demat, and cut hair, fur, and tangles, to groom an animal.

Yet another embodiment is shown in FIG. 5, wherein a grooming tool mechanism 500 operates by use of a motor 525, to drive a gear 526, to rotate a follower gear 522 to drive a camshaft first portion 520, rotating offset elements 506 and camshaft segments 502 to urge cutting elements 508 in an offset rotatory movement that moves leading cutting edges 512 in cooperation with dematting tines 514 secured by brads 518 to the cutting elements 508 and secured at the distal end on a fixed shaft.

Other and further embodiments utilizing one or more aspects of the systems and methods disclosed herein may be devised without departing from the spirit of Applicant's disclosure. For example, the systems and methods disclosed herein may be used alone or to form one or more parts of other devices, device components, and/or grooming systems. The grooming mechanisms of the disclosure may be applied to various forms of grooming devices. As another example, although the embodiments shown in the figures for illustrative purposes reflect one or more exemplary shapes of components, this is in no way intended to be limiting or exhaustive as, in use, various embodiments and modifications may be implemented using different configurations, whether for various types of products or otherwise. Further, the various methods and embodiments of the grooming devices and components may be included in combination with each other to produce variations of the disclosed methods and embodiments.

Discussion of singular elements may include plural elements and vice-versa. References to at least one item followed by a reference to the item may include one or more items.

The apparatuses and methods described herein may be modified or altered to comprise more aspects, concurrent steps, simultaneous steps, or other variations.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

Skilled artisans may implement the described functionality in varying ways for each particular application, but such implementation decisions should not be interpreted as causing a departure from the scope of the present invention.

The word "exemplary" is used exclusively herein to mean "serving as an example, instance, or illustration." Any embodiment described herein as "exemplary" is not necessarily to be construed as preferred or advantageous over other embodiments.

In this document, relational terms such as first and second, and the like may be used solely to distinguish one entity or action from another entity or action without necessarily requiring or implying any actual such relationship or order between such entities or actions. Numerical ordinals such as "first," "second," "third," and such simply denote different singles of a plurality and do not imply any order or sequence unless specifically defined by the claim language. The sequence of the text in any of the claims does not imply that steps must be performed in a temporal or logical order according to such sequence unless it is specifically defined by the language of the claim. The steps may be interchanged in any order without departing from the scope of the invention as long as such an interchange does not contradict the claim language and is not logically nonsensical.

Furthermore, depending on the context, two elements may be connected to each other physically or in any other manner, through one or more additional elements.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. Various changes may be made in the function and arrangement of elements without departing from the scope of the invention as set forth in the appended claims and the legal equivalents thereof.

The invention claimed is:

1. An animal grooming device comprising:

a handle;

a housing attached to the handle;

a plurality of combing tines projecting from the housing;

a plurality of linkage arms, each linkage arm operatively connected to at least one of the combing tines;

a reciprocating mechanism, selected from a group consisting of a crank, cam, or motor, coupled operatively to the linkage arms;

wherein the reciprocating mechanism is configured to drive the linkage arms such that the combing tines reciprocate and/or perform a coordinated scissoring action relative to one another.

2. The device of claim 1, further comprising:

at least one cutting blade positioned such that the movement of at least one of the combing tines brings the at least one cutting blade into a scissoring relationship with the corresponding tine, and wherein the reciprocating mechanism drives the linkage arms to simultaneously effect scissoring movement between the combing tines and the at least one cutting blade.

3. The device of claim 2, wherein:

the linkage arms and combing tines are mounted on a shaft having an arcuate or straight geometry, and are additionally guided in movement by protective guide members within the housing.

4. The device of claim 1, further comprising:

a mode selection mechanism configured to permit user selection between a combing mode, a dematting mode, and a cutting mode by adjusting the position or operation of the reciprocating mechanism.

5. A method of grooming an animal, comprising;

providing an animal grooming device according to claim 3;

actuating the reciprocating mechanism to drive the linkage arms such that the combing tines reciprocate and/or perform a scissoring action;

engaging the combing tines with fur on an animal to detangle mats;

further advancing at least one combing tine into a scissoring relationship with a cutting blade to slice through at least a portion of a mat.

6. The method of claim 5, wherein the reciprocating mechanism is manually driven by a rotatable crank coupled to the shaft.

7. The method of claim 5, wherein the reciprocating mechanism comprises an electric motor, a cam, and a gear train for driving the linkage arms in coordinated motion.

8. The device of claim 2, wherein the at least one cutting blade is securely attachable to at least one linkage arm.

9. The method of claim 5, wherein actuating of the reciprocating mechanism moves at least two adjacent combing tines differentially to execute a converging or diverging path during actuation.

10. The method of claim 5, wherein actuation of the linkage arms reduces vibration and user hand fatigue compared to devices in which tines or cutting blades are repositioned by direct rotational retraction.

11. The device of claim 1, further comprising a curved blade coupled to a follower arm and a separate cutting element on a rotating shaft, where rotation of the shaft moves the cutting element towards and away from the curved blade and translates an opposing cutting element to form and open a nip.

12. The device of claim 1, wherein the plurality of combing tines is arranged in a fan-like formation along the shaft, with each tine secured to a respective linkage arm by a rivet or brad.

13. The method of claim 5, wherein the actuating of the reciprocating mechanism vibrates/oscillates the tines for grooming and, upon a change in handle orientation or control position, drives the at least one cutting blade into a cutting nip.

* * * * *